United States Patent
Takehana

(10) Patent No.: US 11,105,429 B2
(45) Date of Patent: Aug. 31, 2021

(54) VALVE DEVICE

(71) Applicant: MIKUNI CORPORATION, Tokyo (JP)

(72) Inventor: Norio Takehana, Takizawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 16/163,084

(22) Filed: Oct. 17, 2018

(65) Prior Publication Data

US 2019/0120391 A1 Apr. 25, 2019

(30) Foreign Application Priority Data

Oct. 20, 2017 (JP) .............................. JP2017-203622

(51) Int. Cl.
*F16K 7/17* (2006.01)
*F16K 15/14* (2006.01)
(Continued)

(52) U.S. Cl.
CPC .............. *F16K 7/17* (2013.01); *F02M 37/046* (2013.01); *F02M 37/12* (2013.01); *F16K 15/148* (2013.01); *F16K 25/00* (2013.01); *F16K 31/1266* (2013.01)

(58) Field of Classification Search
CPC .......... F16K 7/17; F16K 15/148; F16K 25/00; F16K 31/1266; F02M 37/046;
(Continued)

(56) References Cited

U.S. PATENT DOCUMENTS 2,005,954 A * 6/1935 Petersen ................. F16K 15/06
137/533.29
3,317,002 A * 5/1967 McKenzie .............. F16N 13/06
184/7.4
(Continued)

FOREIGN PATENT DOCUMENTS

| JP | 2003-90447 | 3/2003 |
| JP | 2013-44372 | 3/2013 |
| JP | 2016-84853 | 5/2016 |

OTHER PUBLICATIONS

Notice of Reasons for Refusal, dated Jun. 16, 2021, in corresponding Japanese Patent Application No. 2017-203622 (7 pp.).

*Primary Examiner* — Kevin F Murphy
*Assistant Examiner* — Jonathan J Waddy
(74) *Attorney, Agent, or Firm* — Staas & Halsey, LLP

(57) ABSTRACT

A check valve for opening/closing intake-side communication passages through which fuel passes, includes a pump body including a partition wall with the communication passages formed therein, a valve body supported by the partition wall, made of a flexible material, and formed into a plate shape, and a valve seat provided around opening portions of the communication passages on the partition wall and including a seat surface to abut against the valve body when the valve is closed, the seat surface including a groove having an opening-portion-side wall surface lying on an upstream side and an outer-side wall surface lying on a downstream side, the upstream and downstream sides being sides in a direction in which fluid passes between the valve body and the seat surface when the valve is opened, the outer-side wall surface having a gentler slope than a slope of the opening-portion-side wall surface.

3 Claims, 5 Drawing Sheets

(51) Int. Cl.
*F16K 31/126* (2006.01)
*F16K 25/00* (2006.01)
*F02M 37/12* (2006.01)
*F02M 37/04* (2006.01)

(58) Field of Classification Search
CPC ..... F02M 37/12; F04B 39/107; F04B 39/108; F04B 39/1086; F04B 39/1073
USPC .......................................... 251/359; 137/855
See application file for complete search history.

(56) References Cited

U.S. PATENT DOCUMENTS

| | | | | |
|---|---|---|---|---|
| 3,628,564 | A * | 12/1971 | Bishop | F02M 59/00 137/516.29 |
| 4,376,885 | A * | 3/1983 | Smirra | B23K 15/04 137/243 |
| 5,697,770 | A * | 12/1997 | Schulz | F02M 37/046 417/560 |
| 6,953,051 | B2 * | 10/2005 | An | F04B 39/1066 137/514 |
| 2002/0139953 | A1 * | 10/2002 | Hagiwara | F16K 1/36 251/318 |
| 2006/0118190 | A1 * | 6/2006 | Takehana | F04B 53/105 137/854 |
| 2006/0118752 | A1 * | 6/2006 | Tin-Kai | F16K 1/425 251/331 |
| 2010/0140527 | A1 * | 6/2010 | Glime | F16K 25/00 251/359 |
| 2011/0095222 | A1 * | 4/2011 | Flores | B24B 15/00 251/359 |
| 2012/0097881 | A1 * | 4/2012 | Aoyama | F16K 1/425 251/359 |
| 2016/0115845 | A1 * | 4/2016 | Fujita | F16K 1/42 251/318 |

* cited by examiner

A-A CROSS SECTION

A-A CROSS SECTION

B-B CROSS SECTION

VALVE DEVICE

CROSS REFERENCE TO RELATED APPLICATIONS

This application is based upon and claims the benefit of priority of the prior Japanese Patent Application No. 2017-203622, filed on Oct. 20, 2017, the entire contents of which are incorporated herein by reference.

BACKGROUND OF THE INVENTION

Field of the Invention

The present invention relates to a valve device, particularly to a valve device for opening and closing a passage for fluid.

Description of the Related Art

Various valve devices for opening and closing a passage of fluid, such as a check valve used in a fuel pump of an engine, are known.

For example, a check valve for a fuel pump described in Japanese Patent Laid-Open No. 2003-90447 is provided at an opening portion of a communication passage that communicates with two chambers and through which fuel passes, the check valve including a disc-shaped flexible material such as a resin membrane as a valve body. In the valve body, its central portion is supported, and its outer circumferential portion is swingable. The valve body has a structure for opening and closing a plurality of opening portions arranged concentrically with the supported portion. Surrounding the opening portions, a valve seat is provided, the valve seat protruding toward the valve body. When a pressure on one of both sides of the valve body, the side opposite to the communication passage, exceeds a pressure on the communication passage side, the valve body and the valve seat come into contact with each other to seal the opening portions. In contrast, when the pressure on the communication passage side exceeds the pressure on the opposite side, the valve body and the valve are separated from each other to open the opening portions.

In a valve including a valve body made of a flexible-material-made plate member, such as one described in the above Literature, fluid passes between the valve body and a valve seat when the valve body is opened.

Now, if the fluid contains an entrained grain such as a foreign object, the grain can be caught between the valve body and the valve seat as the valve body is closed. In such a case, the valve body fails to seal the opening portions completely, and leakage may occur.

SUMMARY OF THE INVENTION

The present invention is made in light of such a problem. Its objective is to provide a valve device capable of preserving a stoppage function of its valve body even in a case of an admixture of a grain.

To achieve the objective, a valve device according to the present invention is a valve device for opening and closing a passage of fluid, the valve device including: a housing including a wall member including the passage; a valve body supported by the wall member, the valve body being made of a flexible material and formed into a plate shape; and a valve seat provided around an opening portion of the passage on the wall member and including a seat surface to abut against the valve body when a valve is closed, the seat surface including a groove having side surfaces on an upstream side and a downstream side in a direction in which the fluid passes between the valve body and the valve seat when the valve is opened, the side surface on the downstream side having a gentler slope than a slope of the side surface on the upstream side.

With the valve device according to the present invention, even when a grain such as a foreign object entrained in fluid is caught between the valve body and the valve seat when the valve is closed, the grain is trapped in the groove, which prevents a poor contact between the valve body and the valve seat when the valve is closed, enabling a valve closing function to be maintained.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Hereinafter, an embodiment of the present invention will be described with reference to the accompanying drawings.

Figure 1:
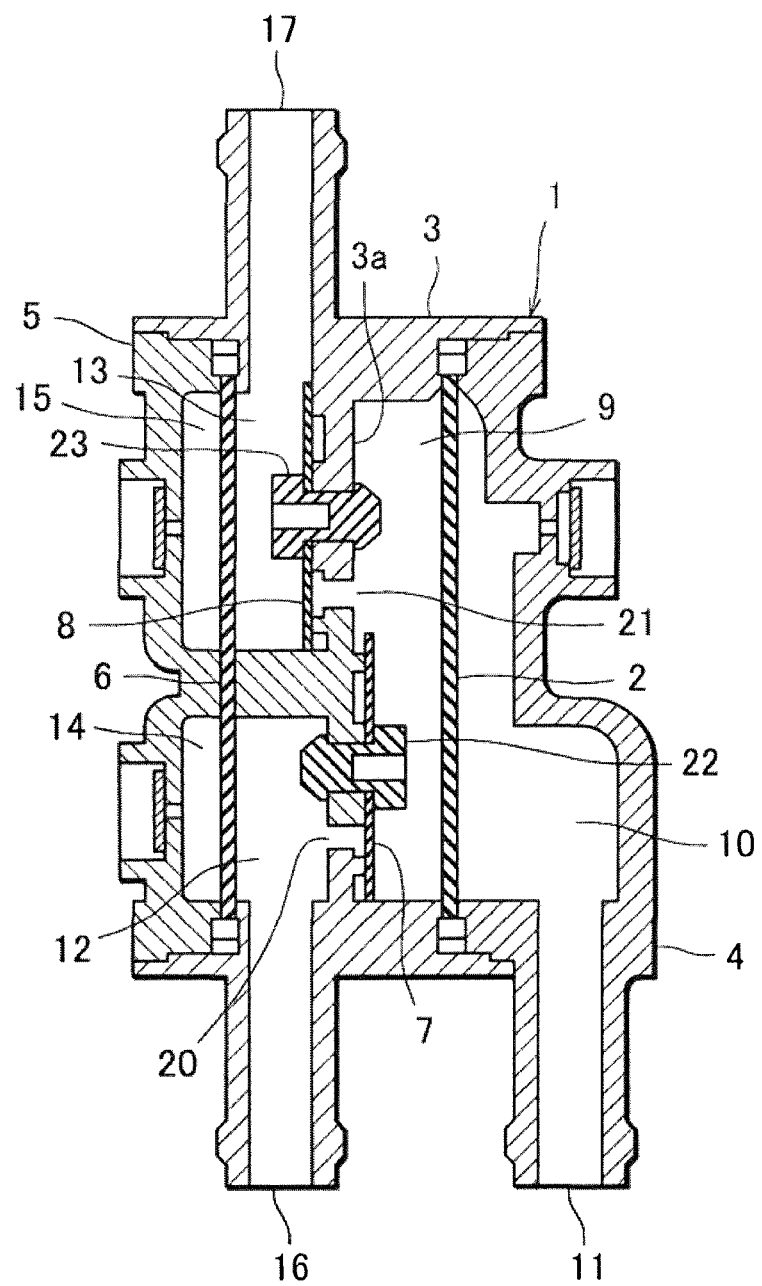
FIG. 1 is a vertical cross-sectional view illustrating a structure of a diaphragm fuel pump in which a valve device according to the present invention is used.

FIG. 1 is a vertical cross-sectional view illustrating an internal structure of a fuel pump 1, in which a valve device according to the present invention is used.

The fuel pump 1 according to the present embodiment is a fuel pump for supplying fuel to a fuel supply system of an engine from a fuel tank.

As illustrated in FIG. 1, the fuel pump 1 is a diaphragm fuel pump including a diaphragm 2. The fuel pump 1 includes a pump body 3, a bottom body 4, a cover 5, a diaphragm 2, a membrane 6, a first check valve 7, and a second check valve 8. The first check valve 7 and the second check valve 8 are check valves and each equivalent to the valve device according to the present invention. The pump body 3, the bottom body 4, and the cover 5 are equivalent to a housing according to the present invention.

The pump body 3, the bottom body 4, and the cover 5 are formed of, for example, a resin. The pump body 3 includes a partition wall 3a therein and is formed into a substantially cylindrical shape with its both lateral sides opened. The bottom body 4 is fixed to one of the lateral sides of the pump body 3, sealing the one lateral side. The cover 5 is fixed to the other lateral side of the pump body 3, sealing the other lateral side. The partition wall 3a is equivalent to a wall member according to the present invention.

The diaphragm 2 and the membrane 6 are each made of, for example, NBR rubber and formed into a thin disk shape. The diaphragm 2 is sandwiched between the pump body 3 and the bottom body 4. The membrane 6 is sandwiched between the pump body 3 and the cover 5.

Between the diaphragm 2 and the partition wall 3a of the pump body 3, a pump chamber 9 is provided. Between the diaphragm 2 and the bottom body 4, a pulse chamber 10 is provided. That is, the diaphragm 2 separates the pump chamber 9 and the pulse chamber 10 from each other. The bottom body 4 includes a pulse introduction port 11 for introducing a pressure into the pulse chamber 10, and through the pulse introduction port 11, a pulsing pressure pulse such as intake air is introduced into the pulse chamber 10 from an intake manifold or a crank chamber of an engine (not illustrated).

Between the membrane 6 and the partition wall 3a of the pump body 3, a fuel intake chamber 12 and a fuel discharge chamber 13 are provided. Between the membrane 6 and the cover 5, an intake-side dumping chamber 14 and a discharge-side dumping chamber 15 are provided, the intake-side dumping chamber 14 being opposite to the fuel intake chamber 12 across the membrane 6, the discharge-side dumping chamber 15 being opposite to the fuel discharge chamber 13 across the membrane 6. That is, the membrane 6 separates the fuel intake chamber 12 and the intake-side dumping chamber 14 from each other, and separates the fuel discharge chamber 13 and the discharge-side dumping chamber 15 from each other.

The pump body 3 includes an inlet 16 communicating with the fuel intake chamber 12 and an outlet 17 communicating with the fuel discharge chamber 13. The inlet 16 is connected to a fuel tank (not illustrated), and the outlet 17 is connected to a fuel supply system such as a fuel injection valve of an engine.

The partition wall 3a of the pump body 3 includes intake-side communication passages 20 and discharge-side communication passages 21, the intake-side communication passages 20 connecting the fuel intake chamber 12 and the pump chamber 9, the discharge-side communication passages 21 connecting the pump chamber 9 and the fuel discharge chamber 13. The intake-side communication passages 20 and the discharge-side communication passages 21 are each equivalent to a passage according to the present invention.

The first check valve 7 is provided in the partition wall 3a of the pump body 3 and has a function of opening/closing the intake-side communication passages 20. The first check valve 7 has a function of allowing fuel to pass only from the fuel intake chamber 12 to the pump chamber 9.

The second check valve 8 is provided in the partition wall 3a of the pump body 3 and has a function of opening/closing the discharge-side communication passage 21. The second check valve 8 has a function of allowing fuel to pass only from the pump chamber 9 to the fuel discharge chamber 13.

The first check valve 7 and the second check valve 8 are supported by rubber-made grommets 22 and 23 to be fixed to the pump body 3.

Figure 2:
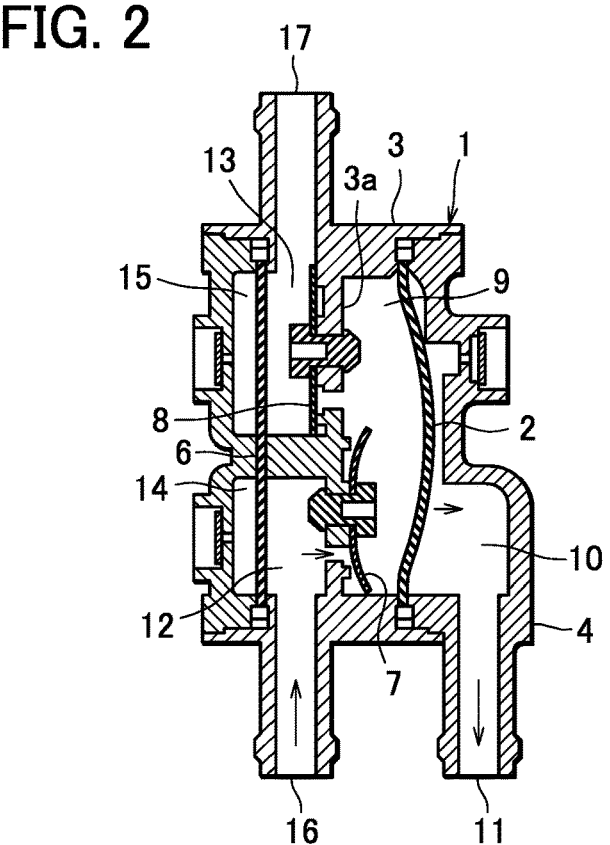
FIG. 2 is a vertical cross-sectional view illustrating the fuel pump according to the present embodiment with fuel being taken therein.
Figure 3:
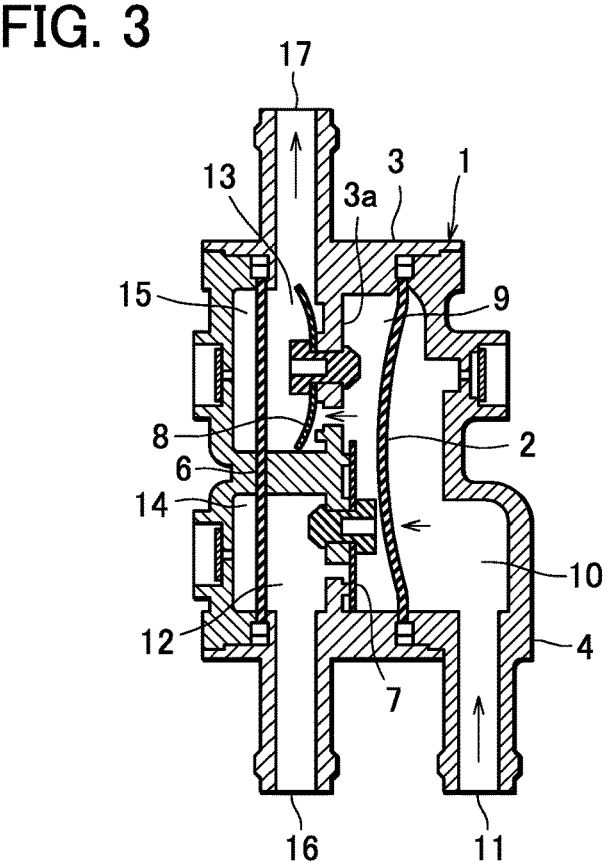
FIG. 3 is a vertical cross-sectional view illustrating the fuel pump according to the present embodiment with fuel being discharged therefrom.

FIG. 2 is a vertical cross-sectional view illustrating the fuel pump 1 with fuel being taken therein. FIG. 3 is a vertical cross-sectional view illustrating the fuel pump 1 with fuel being discharged therefrom. In FIG. 2 and FIG. 3, drawn arrows indicate a moving direction of fuel, intake air, and the like.

In the fuel pump 1 configured as described above, when a pressure pulse is introduced in the pulse chamber 10 as an engine operates, and the pulse chamber 10 is placed under a negative pressure, as illustrated in FIG. 2, the diaphragm 2 moves toward the bottom body 4, rightward in FIG. 2. As a result, the pump chamber 9 is placed under a negative pressure, which causes the first check valve 7 open and the second check valve 8 close, so that fuel moves from the fuel intake chamber 12 to the pump chamber 9.

When the pulse chamber 10 is placed under a positive pressure, as illustrated in FIG. 3, the diaphragm 2 moves away from the bottom body 4, leftward in FIG. 3. As a result, the pump chamber 9 is placed under a positive pressure, which causes the first check valve 7 to close and the second check valve 8 to open, so that fuel moves from the pump chamber 9 to the fuel discharge chamber 13.

By supplying pressure pulses alternating positive and negative pressures from the engine to the pulse chamber 10, the diaphragm 2 alternates the movements illustrated in FIG. 2 and FIG. 3, so that fuel is taken from the inlet 16 and discharged from the outlet 17.

The membrane 6 cushions steep changes in pressure in the fuel intake chamber 12 and the fuel discharge chamber 13. This stabilizes the discharge of fuel from the fuel discharge chamber 13 of the fuel pump 1.

Next, the first check valve 7 will be described in detail with reference to FIG. 4 to FIG. 9.

Figure 4:
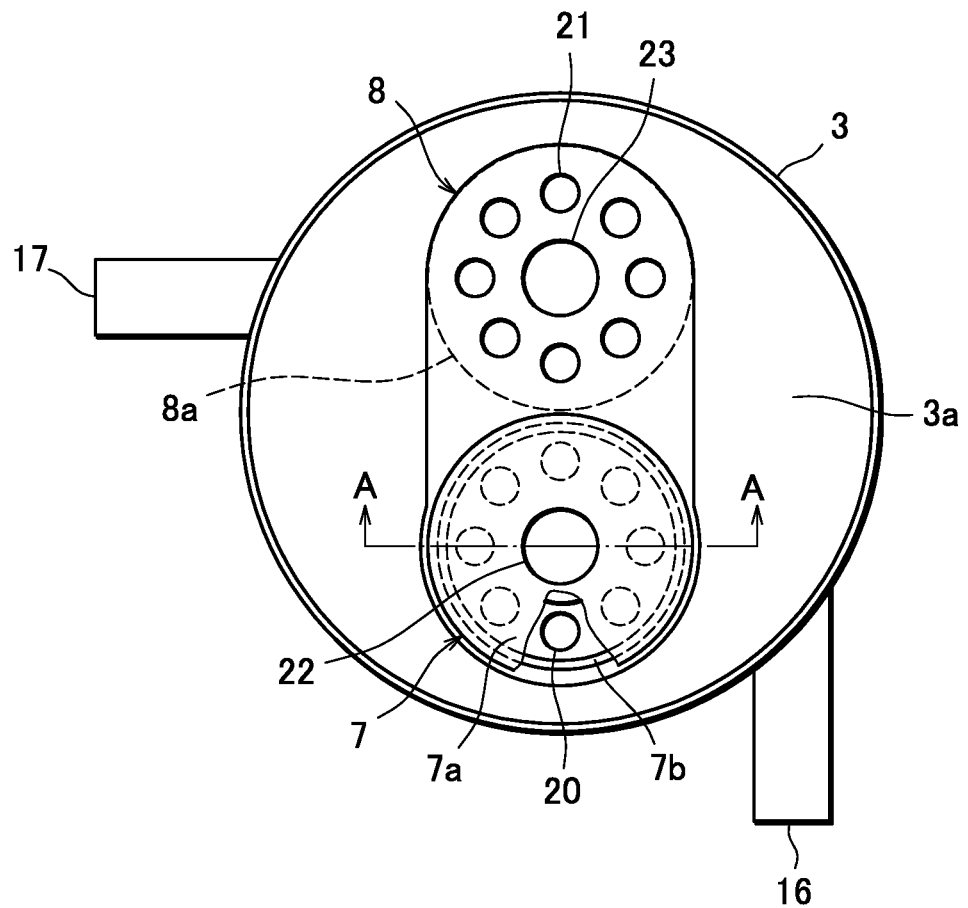
FIG. 4 is a top view of a pump body with a first check valve and a second check valve according to the present embodiment.
Figure 5:
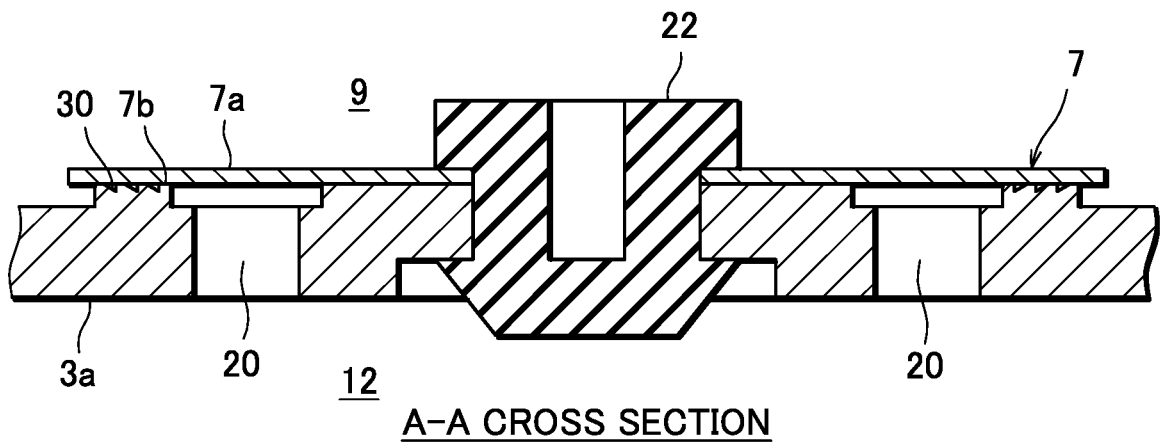
FIG. 5 is a vertical cross-sectional view illustrating a cross-sectional shape of the first check valve closed.
Figure 6:
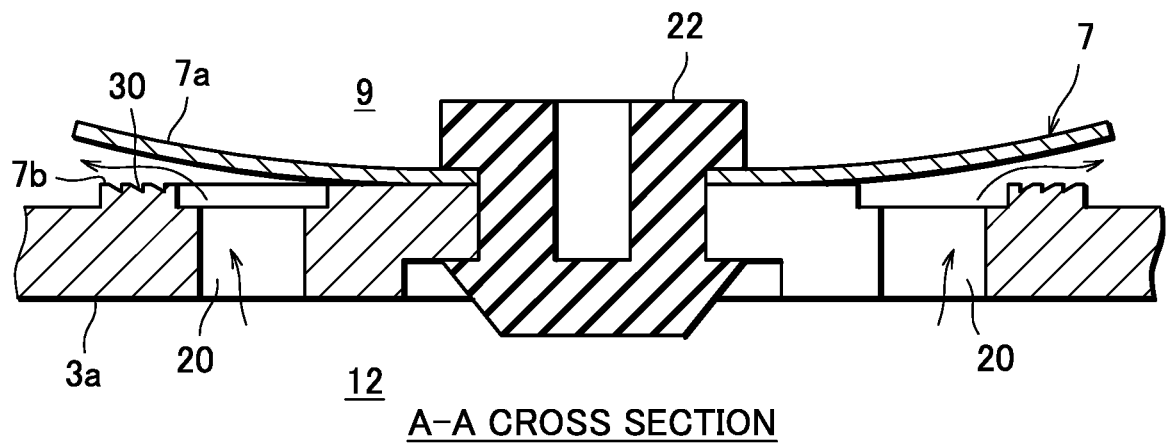
FIG. 6 is a vertical cross-sectional view illustrating a cross-sectional shape of the first check valve opened.

FIG. 4 is a top view of the pump body 3 with the first check valve 7 and the second check valve 8. FIG. 5 is a vertical cross-sectional view illustrating a cross-sectional shape of the first check valve 7 closed. FIG. 6 is a vertical cross-sectional view illustrating a cross-sectional shape of the first check valve 7 opened. FIG. 4 is a diagram of the first check valve 7 and the second check valve 8 provided in the pump chamber 3 viewed from a pump chamber 9 side. FIGS. 5 and 6 are cross-sectional views taken along the line A-A drawn in FIG. 4. Arrows drawn in FIG. 6 indicate moving directions of fuel.

As illustrated in FIGS. 4 and 5, the first check valve 7 provided in the partition wall 3a includes a valve body 7a, which has an annular thin plate shape and a flexibility such as that of a resin plate. The valve body 7a is supported to the partition wall 3a at its center portion by the rubber-made grommet 22.

There are a plurality of intake-side communication passages 20 provided in the partition wall 3a around the grommet 22 and spaced apart in a circumferential direction. On a wall surface of the partition wall 3a on the pump chamber 9 side, a valve seat 7b is provided on an outer side of the intake-side communication passages 20, the valve seat 7b protruding in a ring shape and including a top surface that serves as a seat surface. All opening portions of the intake-side communication passages 20 and the valve seat 7b are covered with the valve body 7a.

The second check valve 8 includes a valve body 8a made of the same material and having the same shape as the valve body 7a. The valve body 8a is similarly supported to the partition wall 3a at its center portion by the grommet 23. There are a plurality of discharge-side communication passages 21 provided around the grommet 23 and spaced apart in a circumferential direction, as with the intake-side communication passages 20. In the second check valve 8, the valve body 8a and the valve seat are provided not on the pump chamber 9 side but on a fuel discharge chamber 13 side that is opposite to the pump chamber 9, which differs from the first check valve 7.

As illustrated in FIG. 5, in the first check valve 7, when a pressure in the pump chamber 9 is higher than that in the fuel intake chamber 12, an outer circumferential portion of the valve body 7a abuts against the valve seat 7b of the partition wall 3a. This closes the opening portions of the intake-side communication passages 20 with the valve body 7a, blocking an inflow of fuel from the pump chamber 9 to the fuel intake chamber 12.

In contrast, as illustrated in FIG. 6, when a pressure in the fuel intake chamber 12 is higher than that in the pump chamber 9, an outer circumferential portion of the valve body 7a bends towards the pump chamber 9 side. As a result, the outer circumferential portion of the valve body 7a separates from the valve seat 7b. Fuel in the fuel intake chamber 12 therefore passes from the intake-side communication passages 20 through between the valve body 7a and the valve seat 7b into the pump chamber 9.

Figure 7:
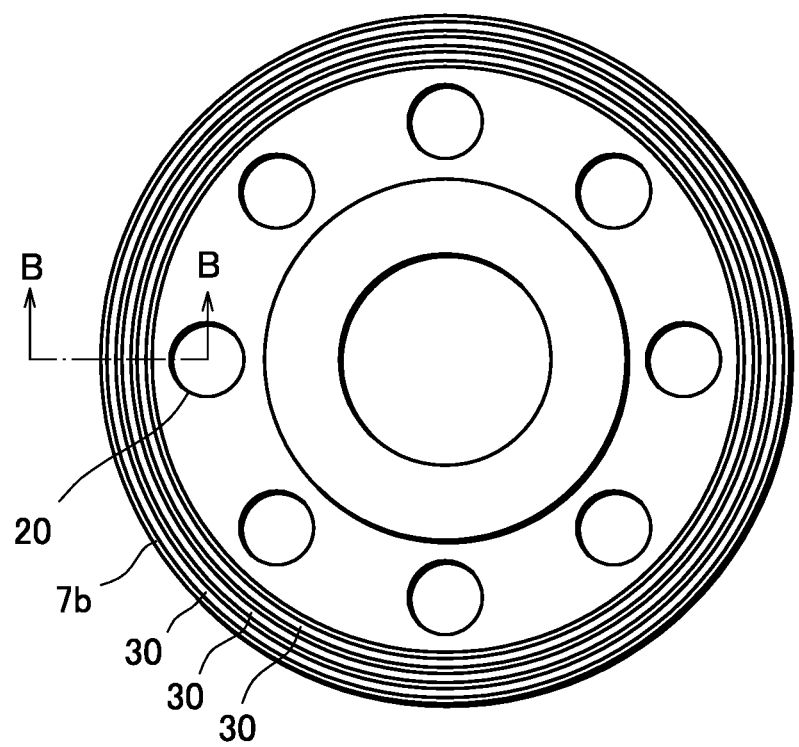
FIG. 7 is a top view illustrating a shape of a valve seat.
Figure 8:
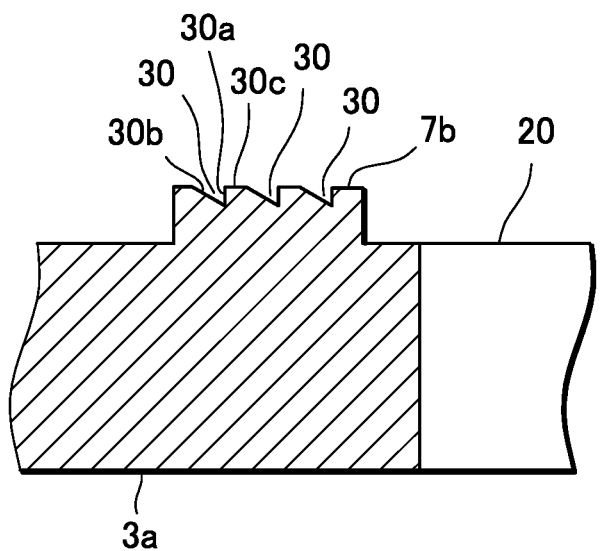
FIG. 8 is an enlarged sectional view illustrating a cross-sectional shape of the valve seat.
Figure 9:
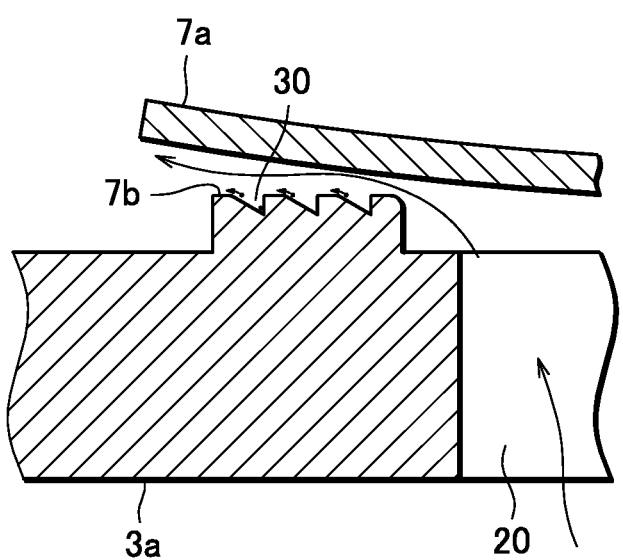
FIG. 9 is an explanatory diagram illustrating how a grain is ejected when the valve is opened.

FIG. 7 is a top view illustrating a shape of the valve seat 7b. FIG. 7 illustrates a shape of a wall surface of the partition wall 3a on the pump chamber 9 side. FIG. 8 is an enlarged cross-sectional view taken along the line B-B of FIG. 7. FIG. 9 is an explanatory diagram illustrating how a grain is ejected when the valve is opened. Arrows drawn in FIG. 9 indicate moving directions of fuel or a grain.

As illustrated in FIGS. 7 and 8, the ring-shaped valve seat 7b surrounding the opening portions of the intake-side communication passages 20 includes a plurality of grooves 30 on its upper surface, the grooves each having a ring shape. The grooves 30 are provided concentrically with the ring-shaped valve seat 7b, and disposed spaced apart from each other in a radial direction.

The grooves 30 each have a depth of, for example, about 0.2 to 0.4 mm. The grooves 30 each have a cross section in a substantially triangular shape. The grooves 30 therefore make the cross section of the valve seat 7b serrate. A bottom of each groove 30 forms an edge portion with a chamfer of about R0.1 to 0.2 mm.

A side surface of each groove 30 on an intake-side communication passage 20 side, that is, an opening-portion-side wall surface 30a being an inner side surface of the groove 30 is formed to be perpendicular to the seat surface of the valve seat 7b. A side surface of each groove 30 on an opposite side to the intake-side communication passage 20 side, that is, the outer-side wall surface 30b being an outer side surface of the groove 30 is formed into a gentle slope inclined from the opening-portion-side wall surface 30a at an angle about 60 degrees. Between adjacent grooves 30, a flat surface 30c being about 0.5 mm in width is secured for ensuring a sheet property.

FIG. 9 is an explanatory diagram illustrating how a grain is ejected. FIG. 9 illustrates a state of the valve seat 7b and the valve body 7a when the valve is opened, as well as an example of movements of fuel and a grain in a form of arrows.

When a pressure in the fuel intake chamber 12 is higher than that in the pump chamber 9 to open the first check valve 7, fuel in the fuel intake chamber 12 moves from the intake-side communication passages 20 through between the valve body 7a and the valve seat 7b outward in a radial direction of the valve body 7a, as illustrated in FIG. 9.

In a case of a valve device including a typical valve seat and valve body, if a grain such as a foreign object is caught between the valve seat and the valve body, the valve seat and the valve body may fail to come into close contact with each other to allow a flowing path of fluid to establish between the valve seat and the valve body, which may result in a leakage of the fluid. When the leakage occurs in the first check valve 7 of the fuel pump 1 as described above, a function of the first check valve 7 deteriorates, which may cause fuel to flow back from the pump chamber 9 to the fuel intake chamber 12. This compromises an efficiency of the fuel pump 1.

Even when a grain such as a foreign object is caught between the valve seat 7b and the valve body 7a as the valve is closed, the provision of the grooves 30 in the valve seat 7b as in the first check valve 7 according to the present embodiment allows the grain to move into a groove 30, securing a close contact between the valve seat 7b and the valve body 7a. As a result, it is possible to reduce occurrence of leakages due to a grain caught as the first check valve 7 is closed, enhancing a valve closing function. Being about 0.2 to 0.4 mm, the depth of the grooves 30 provided in the valve seat 7b is enough to trap a grain such as a foreign object in a groove 30.

In the present embodiment, an outer-side wall surface 30b of each groove 30 on an opposite side to the intake-side communication passage 20, that is, a side surface of the groove 30 on a downstream side of a fuel passing direction is formed into a gentle slope with an angle of about 60 degrees, which makes it easy for a grain trapped in a groove 30 to move toward the outer-side wall surface 30b. Accordingly, when the valve body 7a is opened, it is possible to move a grain in a groove 30 and ejected it outward in the radial direction as fuel passes between the valve body 7a and the valve seat 7b. It is therefore possible to maintain the valve closing function of the first check valve 7.

Forming the outer-side wall surface 30b of each groove 30 to be gently inclined can prevent a passing speed of fuel from decreasing due to the provision of the grooves 30 while avoiding fuel passing between the valve seat 7b and the valve body 7a outward in the radial direction from being hindered as much as possible.

Since the opening-portion-side wall surface 30a of each groove 30 on the intake-side communication passage 20 side is formed to be perpendicular to the seat surface of the valve seat 7b, it is possible to prevent backflow leakages of fuel from an outer circumferential portion side to the intake-side communication passage 20 side between the valve seat 7b and the valve body 7a.

The descriptions of the embodiments will be finished here, but aspects of the present invention are not limited to the above embodiments. For example, although the above embodiment describes the configuration of the first check valve 7, the second check valve 8 may be provided with grooves 30 on its valve seat on the fuel discharge chamber 13 side, the grooves each having the same shape as in the first check valve 7.

Although the present embodiment is an application of the present invention to the first check valve 7 for controlling a flow of fuel, the present invention is also applicable to a check valve for controlling a flow of liquid other than fuel.

Although the ring-shaped grooves 30 are provided in the above embodiment on the ring-shaped valve seat 7b provided on the periphery of the opening portions of the intake-side communication passages 20, the present invention is applicable even to a valve device including a rectangular opening portion and a rectangular valve body formed of a flexible material, such as a reed valve. Also in this case, providing grooves on its valve seat at a location where fluid passes in one direction between the valve body and the valve seat as the valve is opened. The grooves may each have any shape as long as the shape extends in a direction substantially perpendicular to a fluid passing direction.

The present invention may be applied to a check valve used in systems other than fuel pumps. The present invention is widely applicable to even a valve device other than a check valve as long as the valve device has a structure in which a valve is opened with its valve body of flexibility brought into close contact with its valve seat.

What is claimed is:

1. A valve device for opening and closing a passage for fluid, the valve device comprising:
    a housing including a wall member including the passage;
    a valve body supported by the wall member, the valve body being made of a flexible material and formed into a plate shape; and
    a valve seat provided around an opening portion of the passage on the wall member and including a seat surface to abut against the valve body when the valve device is closed, the seat surface including a plurality of grooves, the plurality of grooves including a groove having side surfaces on an upstream side and a downstream side in a direction in which the fluid passes between the valve body and the seat surface when the valve device is opened, the side surface on the downstream side having a gentler slope than a slope of the side surface on the upstream side,
    wherein the plurality of grooves is formed into a ring shape around the entire circumference of the opening portion,
    the seat surface and the plurality of grooves of the valve seat are formed in the wall member,
    the valve seat, between adjacent grooves of the plurality of grooves, has a flat surface as the seat surface abuts against the valve body when the valve device is closed, the cross section of the valve seat is serrated by the plurality of grooves, and the side surface on the upstream side of the plurality of grooves is formed perpendicular to the flat surface, and
    the grooves are disposed spaced apart from each other in a radial direction, in the plurality of grooves formed on the valve seat, side surfaces on respective upstream sides of the grooves in the direction in which the fluid passes are formed perpendicular to the flat surface, and side surfaces on respective downstream sides of the grooves have a gentler slope than a slope of the side surfaces on the upstream sides.

2. A valve device for opening and closing a passage for fluid, the valve device comprising:
    a housing including a wall member including the passage;
    a valve body supported by the wall member, the valve body being made of a flexible material and formed into a plate shape; and
    a valve seat provided around an opening portion of the passage on the wall member and including a seat surface to abut against the valve body when the valve device is closed, the seat surface including a plurality of grooves, the plurality of grooves including a groove having side surfaces on an upstream side and a downstream side in a direction in which the fluid passes between the valve body and the seat surface when the valve device is opened, the side surface on the downstream side having a gentler slope than a slope of the side surface on the upstream side,
    wherein the plurality of grooves is formed into a ring shape around the entire circumference of the opening portion,
    the seat surface and the plurality of grooves of the valve seat are formed in the wall member,
    the valve seat, between adjacent grooves of the plurality of grooves, has a flat surface as the seat surface abuts against the valve body when the valve device is closed, the cross section of the valve seat is serrated by the plurality of grooves, and the side surface on the upstream side of the plurality of grooves is formed perpendicular to the flat surface, and
    the grooves are disposed spaced apart from each other in a radial direction, in the plurality of grooves formed on the valve seat, side surfaces on respective upstream sides of the grooves in the direction in which the fluid passes are formed perpendicular to the flat surface, and side surfaces on respective downstream sides of the grooves have a gentler slope than a slope of the side surfaces on the upstream sides, wherein the valve device is a check valve configured to be opened by the valve body being bent and separated from the valve seat by a pressure difference across the valve body.

3. The valve device according to claim 2, wherein the valve device is provided in a fuel pump, and the fluid is fuel.

* * * * *